(12) United States Patent
Arai et al.

(10) Patent No.: US 7,687,191 B2
(45) Date of Patent: Mar. 30, 2010

(54) SET OF ELECTRODE PLATES FOR ROLLED ELECTROCHEMICAL COMPONENT AND A CELL COMPRISING SUCH ELECTRODE PLATES

(75) Inventors: Naoto Arai, Ikoma (JP); Yasushi Hirakawa, Moriguchi (JP)

(73) Assignee: Panasonic Corporation, Osaka (JP)

( * ) Notice: Subject to any disclaimer, the term of this patent is extended or adjusted under 35 U.S.C. 154(b) by 1365 days.

(21) Appl. No.: 11/019,947

(22) Filed: Dec. 23, 2004

(65) Prior Publication Data
US 2005/0142436 A1 Jun. 30, 2005

(30) Foreign Application Priority Data
Dec. 24, 2003 (JP) .............................. 2003-426864

(51) Int. Cl.
*H01M 6/10* (2006.01)
*H01M 4/64* (2006.01)
(52) U.S. Cl. ........................ 429/94; 429/233; 429/211
(58) Field of Classification Search .................. 429/94, 429/233, 211
See application file for complete search history.

(56) References Cited

U.S. PATENT DOCUMENTS 4,313,741 A * 2/1982 Masuda et al. .................. 96/78
6,187,473 B1 * 2/2001 Tamezane et al. ........... 429/164

FOREIGN PATENT DOCUMENTS

JP 2000-077054 * 3/2000

* cited by examiner

*Primary Examiner*—Dah-Wei Yuan
*Assistant Examiner*—Angela J. Martin
(74) *Attorney, Agent, or Firm*—McDermott Will & Emery LLP

(57) ABSTRACT

The present invention provides a set of electrode plates for rolled electrochemical component and a cell comprising it. The set of electrode plates comprises a stripe-shaped first electrode plate, a stripe-shaped second electrode plate and a stripe-shaped separator, said separator being positioned between the first electrode plate and the second electrode plate, and these three being revolved into a roll in the length direction, wherein said first electrode plate comprising a stripe-shaped first collector and the active material coated on the surface of said first collector, said second electrode plate comprising a stripe-shaped second collector and the active material coated on the surface of said second collector, a first exposed portion with a predetermined width on which the active material are not coated being formed on at least one of two terminals in a width direction of the first electrode plate to constitute a first collecting section, a second exposed portion with a predetermined width on which the active material are not coated being formed on at least one of two terminals in a width direction of the second electrode plate to constitute a second collecting section, a structure for preventing sharp crippling is formed on at least one of said first collecting section and said second collecting section in at least the innermost periphery of the set of electrode plates. Hence, a high quality component having reliable and stable electrical connection between the collecting section and the collecting plate thereof and prevented from inner short-circuit in the set of roll-shaped electrode plates can be obtained.

29 Claims, 6 Drawing Sheets

SET OF ELECTRODE PLATES FOR ROLLED ELECTROCHEMICAL COMPONENT AND A CELL COMPRISING SUCH ELECTRODE PLATES

TECHNICAL FIELD

The present invention relates to the rolled electrochemical components such as cells, double-layered capacitors and like, more specifically, to the improvement of the end section of the collector which is connected to the collecting plate.

BACKGROUND ART

The rolled electrochemical components are widely used in batteries, double-charge-layered capacitors and like. Generally, this component has a set of electrode plates which is revolved into a roll and provided with a stripe-shaped separator disposed between a positive electrode plate which is coated with active material on its stripe-shaped collector and a negative electrode plate which is coated with active material on its stripe-shaped collector. The set of electrode plates together with electrolyte is accommodated in a metal casing and protrudes from the collector of the electrode plate of the positive or negative electrode on both upper and lower end faces or one end face of said set of electrode plates. A collecting plate is typically welded on the top end of the collector.

In the past, a structure was presented, in which a collecting section had a thin metal plate welded and in which the thickness is increased. On an end section of the collector, splits (in the description, "split" means that a collector is only cut resulting in a split which has essentially no width or separation; the "notch" means that a collector is partly cut off and a notch is formed which has a broad width) are formed on the collecting section, and a collecting plate is welded on the collecting section with the notches. Therefore, compared with the cell in which the collector is directly welded to the collecting plate without the thin metal plate welded on its end section, the collecting section will not be damaged and not be bent to such an extent that the separator would be punched or pricked through (i.e., having a hole formed therein) even though the collecting section is strongly pressed through the collecting plate, so that the possibility of an inner short-circuit can be reduced, and the electrical connection between the collecting section and the collecting plate can be stabilized (see, Japanese Patent Published No. 2000-77054).

For the foregoing collection structure of the prior art, however, a thin metal plate is welded on an end section of a collector to form a collecting section with splits formed in an equally-spaced manner, so that there is a problem that the collecting section positioned in the innermost periphery of the set of electrode plate with the smallest radius of curvature which are revolved into a roll can not have a smooth arc-shape but a sharp crimping or crippling, so that the separator may be punched through, thereby the inner short-circuit may occur.

The present invention is directed to solve the foregoing technical problem in prior art. The object of the invention is to provide a set of electrode plates for rolled electrochemical components and cells comprising such components, in which there is reliable and stable electrical connection between the collecting section and the collecting plate in the cell and the inner short-circuit may be avoided in the set.

Hence, with the rolled electrochemical component of the present invention, a high quality component having reliable and stable electrical connection between the collecting section and the collecting plate thereof is provided, which prevents an inner short-circuit in the set of roll-shaped electrode plates.

SUMMARY OF THE INVENTION

The object of the invention is to provide a set of electrode plates for rolled electrochemical component and a cell comprising such components, in which there is reliable and stable electrical connection between the collecting section and the collecting plate in the cell so that an inner short-circuit may be avoided in the set of electrode plates.

In order to realize above object, a set of electrode plates for rolled electrochemical component of the invention, comprises a stripe-shaped first electrode plate, a stripe-shaped second electrode plate and a stripe-shaped separator, said separator being positioned between the first electrode plate and the second electrode plate, and these three being revolved into a roll in the length direction, wherein said first electrode plate comprises a stripe-shaped first collector and the active material coated on the surface of said first collector and said second electrode plate comprises a stripe-shaped second collector and the active material coated on the surface of said second collector, a first exposed portion with a predetermined width on which the active material is not coated being formed on at least one of two terminals in a width direction of the first electrode plate to constitute a first collecting section, a second exposed portion with a predetermined width on which the active material is not coated being formed on at least one of two terminals in a width direction of the second electrode plate to constitute a second collecting section, characterized in that a structure for preventing sharp crimping is formed on at least one of said first collecting section and said second collecting section in at least the innermost periphery of the set of electrode plates.

According to the invention, because the structure for preventing sharp crimping is formed on at least one of said first collecting section and said second collecting section in at least the innermost periphery of the set of electrode plates, the resistance on the initial revolved section is small when revolving is started, the revolving can be executed easily around a revolving core rod and the inner short-circuit due to the sharp crimping formed in the collecting section can be prevented.

In the inventive set or cell, said structure for preventing sharp crimping is formed by cutting off the collecting section which are positioned in at least the innermost periphery.

According to this structure, there is no collecting section on at least the innermost periphery of the set of electrode plates, and hence the involving-resistance from the collecting section cut off and the sharp crimping formed in the collecting section does not appear, resulting in the revolving being easy and the inner-short-circuit being prevented.

In the inventive set or cell, at least 4 splits starting from a side edge of the collecting section in its width direction are formed on the collecting section which is positioned at least in the innermost periphery.

According to this structure, when being revolved, the sharp crimping does not occur on the innermost periphery, so the inner short-circuit due to the sharp crimping formed in the collecting section can be prevented.

In the inventive set or cell, said structure for preventing sharp crimping is formed by forming at least one notch and at least one strip-shaped collecting section at least in the innermost periphery.

According to this structure, when being revolved, the sharp crimping does not occur on the innermost periphery, so the inner short-circuit due to the sharp crimping formed in the collecting section can be prevented.

In the inventive set or cell, said structure for preventing sharp crimping is formed by forming at least one notch or at least four splits in at least one of the layers constituting the collecting section at least in the innermost periphery.

According to this structure, when being revolved, the sharp crimping does not occur on the innermost periphery, so the inner short-circuit due to the sharp crimping formed in the collecting section can be prevented.

A cell of the present invention, comprises: a set of electrode plates, said set of electrode plates comprising a stripe-shaped positive electrode plate, a stripe-shaped negative electrode plate and a stripe-shaped separator, said separator being positioned between the positive electrode plate and the negative electrode plate, and these three being revolved into a roll in the length direction, wherein said positive electrode plate comprises a stripe-shaped positive collector and the active material coated on the surface of said positive collector and said negative electrode plate comprises a stripe-shaped negative collector and the active material coated on the surface of negative second collector, two exposed portions with a predetermined width on which the active material is not coated being formed on at least one of two terminals in a width direction respectively of the positive and negative electrode plates to respectively constitute a positive collecting section and a negative collecting section; a negative collecting plate connected electrically to said negative collecting section; and a positive collecting plate connected electrically to said positive collecting section; characterized in that a structure for preventing sharp crimping is formed on at least one of the positive collecting section and the negative collecting section in at least the innermost periphery of the set of electrode plates.

According to the invention, because the structure for preventing sharp crimping is formed on at least one of said first collecting section and said second collecting section in at least the innermost periphery of the set of electrode plates, the resistance on the initial revolved section is small when revolving is started, the revolving can be executed easily around a revolving core rod and the inner short-circuit due to the sharp crimping formed in the collecting section can be prevented.

DETAILED DESCRIPTION OF PREFERRED EMBODIMENTS

Embodiment

Figure 1:
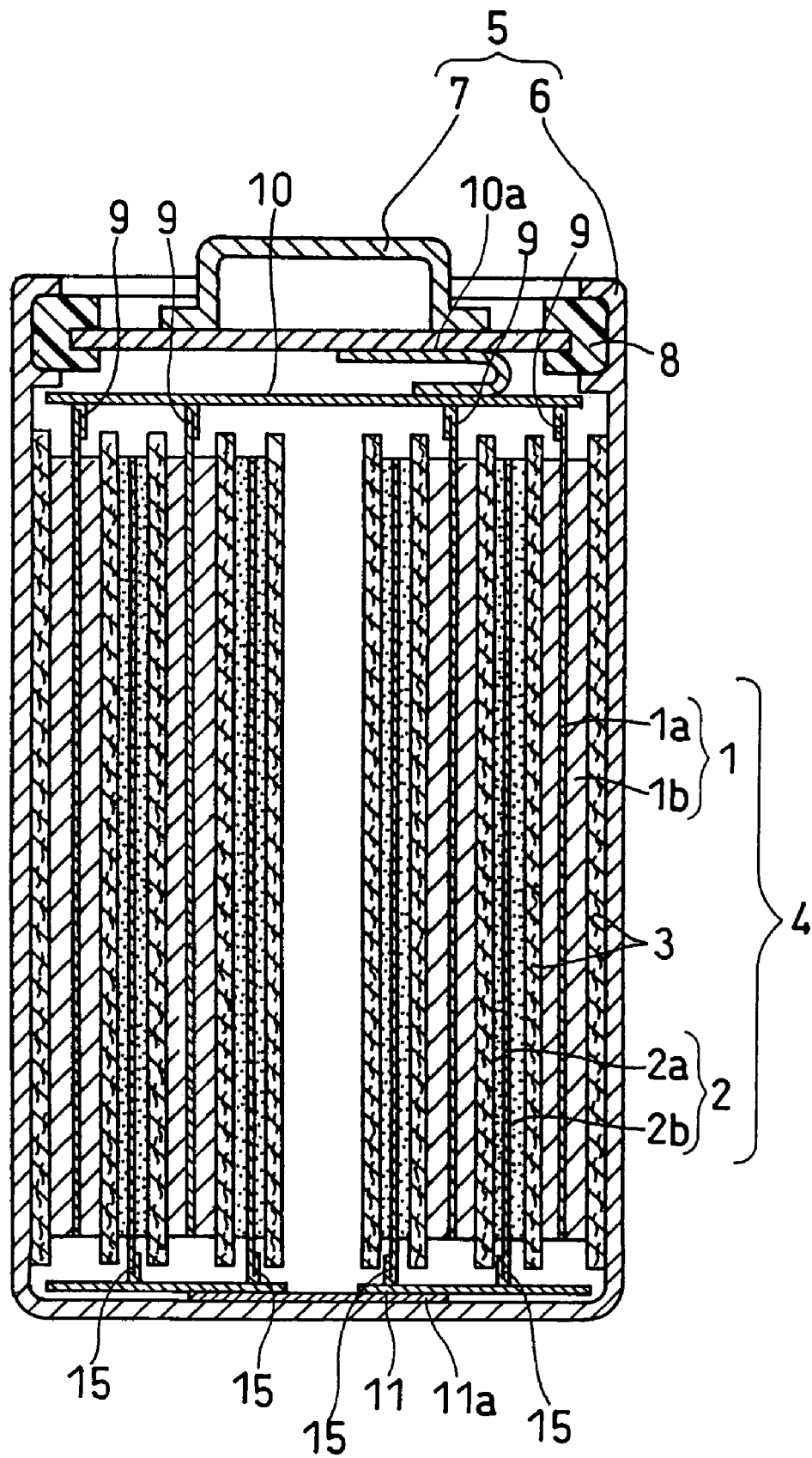
FIG. 1 shows a schematic longitudinal cross-section view of a Lithium ion secondary battery of an embodiment of the invention.

As an embodiment of the invention, FIG. 1 shows a schematic longitudinal cross-section view of a Lithium ion secondary battery having a size of cylinder 18650 (18 mm in diameter and 65 mm in height).

In FIG. 1, separator 3 made of porous polyethylene film is disposed between positive electrode plate 1 which is coated with active material 1b on its stripe-shaped positive collector 1a and negative electrode plate 2 which is coated with active material 2b on its stripe-shaped negative collector 2a, the positive and negative electrode plates are revolved into a roll to form set 4 of electrode plates in the state that two electrode plates are placed opposite to each other, and the set 4 of electrode plates together with a liquid electrolyte is accommodated in cell casing 5. The cell casing 5 consists of a cylinder-shaped cell housing 6 as a negative terminal and a cell cap 7 as a positive terminal. The upper opening of cell housing 6 is secured to the periphery of cell cap 7 through an insulating sealing pad, thereby cell casing 5 is sealed. Moreover, separator 3 is also provided between the outmost periphery of set 4 of electrode plates and the inner periphery face of cell housing 6.

Positive electrode plate 1 and negative electrode plate 2 have the structure as described specifically below. Positive electrode plate 1 is formed by coating both sides of collector 1a made of aluminum foil with positive active-substance 1b, while one end section of positive collector 1a (upper section in FIG. 1) protrudes upward from the section which is coated with positive active-substance 1b. Positive collecting section 9 shown in FIG. 1 is formed by folding the protruding positive collector 1a. Similar to positive electrode plate 1, negative electrode plate 2 has the same structure except that one end section of negative collector 2a made of copper foil (lower section in FIG. 1) protrudes downward from the section which is coated with negative active-substance 2b.

Both end sections of separator 3 protrude upward and downward beyond both end edges of the sections of positive electrode plate 1 or negative electrode plate 2 which is coated with the active material.

Moreover, positive collecting plate 10 is welded to positive collector 1a, negative collecting plate 11 is welded to negative collector 2a, and positive collecting plate 10 and negative collecting plate 11 are welded to the inner surface of cell cap 7 and the inner bottom of cell housing 6 respectively. Connecting piece 10a is provided on positive collecting plate 10 as a wiring piece for connecting collecting plate 10 to the inner surface of cell cap 7. Connecting piece 11a is provided in the center section of collecting plate for connecting negative collecting plate 11 to the inner bottom of cell housing 6.

The liquid electrolyte is the solution which is formed, for example, by dissolving $LiPF_6$ as solute in concentration of 1 mol/dm$^3$ in the mixed solvent of ethylene carbonate (EC) and (DEC) diethyl carbonate in volume ratio of 1:1.

An exemplary method for manufacturing the electrode plates is now described more specifically below. For positive electrode plate 10, the procedure is: mixing electrolyzed $MnO_2$ and $Li_2CO_3$ in mixing ratio 1:2, calcining the mixture under temperature of 800□ in the air for 20 hours to produce $LiMn_2O_4$, mixing $LiMn_2O_4$, acetylene black as a conductor and polyfluorovinylidene as adhesive in weight ratio 92:3:5 to be a mixture as positive active material 1b, above mixing ratio referring to the ratio between the solid compositions, moreover, dissolving polyfluorovinylidene as adhesive in dissolvent of NMP to make positive active-substance 1b be in a pasty state, coating both sides of positive collector 1a with 15 μm thickness made of aluminum foil with the paste of positive active-substance 1b to form layers of positive active-substance 1b in the manner that a lateral edge section with approximately 5 mm width remains without being coated, the layer-thickness on both sides being substantially the same and whole thickness of two layers being approximately 280 μm after coating and drying, and then pressing and shaping the resulting positive electrode plate 1 to make it have thickness of approximately 200 μm.

For negative electrode plate 2, mixing artificial graphite and sutylen butadiene rubber (SBR) as a binder in weight ratio 97:3 to be a mixture as negative active-substance 2b, above mixing ratio referring to the ratio between the solid-state compositions, moreover, dissolving SBR as adhesive in dissolvent of water-solvable resolvent to make negative active-substance 2b be in a pasty state, coating both sides of negative collector 2a with 14 μm thickness made of copper foil with the paste of negative active-substance 2b to form layers of negative active material 2b in the manner that a lateral edge section with 5 mm width remains without being coated, and then pressing and shaping resulting negative electrode plate 2 to make it have thickness of 170 μm.

When manufacturing a Lithium ion secondary battery, positive electrode plate 1 and negative electrode plate 2 obtained as described above are placed opposite to each other with separator 3 being sandwiched therebetween and revolved into a roll to form set 4 of electrode plates in the state that positive collecting section 9 and negative collecting section 15 protrude. The lengths of the sections both positive collecting section 9 and negative collecting section 15 protruding respectively from the end section of separator 3 to both sides are approximately 0.5 mm.

Then positive collecting plate 10 is placed on the positive side of set 4 of electrode plates, making it pressed against positive collecting section 9. Positive collecting plate 10 is ultrasonic-welded with positive collecting section 9 in the state that they are pressed against each other. Then connecting piece 10a having approximately 5 mm in width, 0.15 mm in thickness and 70 mm in length is ultrasonic-welded onto positive collecting plate 10. Moreover, negative collecting plate 11 is provided on the negative side of set 4 of electrode plates, making it pressed against collecting section 15 of positive electrode. Negative collecting plate 11 is resistance-welded with negative collecting section 15 in the state that they are pressed against each other.

Set 4 of electrode plates incorporated with positive collecting plate 10 and negative collecting plate 11 is accommodated in cell housing 6, collecting plate 11 being resistance-welded with the bottom of cell housing 6. Moreover, connecting piece 10a is pressed against cell cap 7 and laser-welded in the state of contacting, then the liquid electrolyte is poured into cell housing 6 with set 4 of electrode plates being therein to soak in vacuum, and cell housing 6 is sealed with cell cap 7.

Positive electrode plate 1 and negative electrode plate 2 will be described in detail below. Two electrode plates can have a same structure, but can have different structures as well. For easy understanding, the thickness of the electrode plate is showed in magnifying manner.

Embodiment 1

FIG. 2 shows a diagram of a manufacturing procedure of positive electrode plate 1 of embodiment 1.

First, as shown in FIG. 2, both sides of collector 1a made of aluminum foil are coated with positive active-substance 1b to form a stripe-shaped positive electrode plate 1, a boundary 12 being formed between the end section of the active material and the collector along the length direction.

Figure 2A:
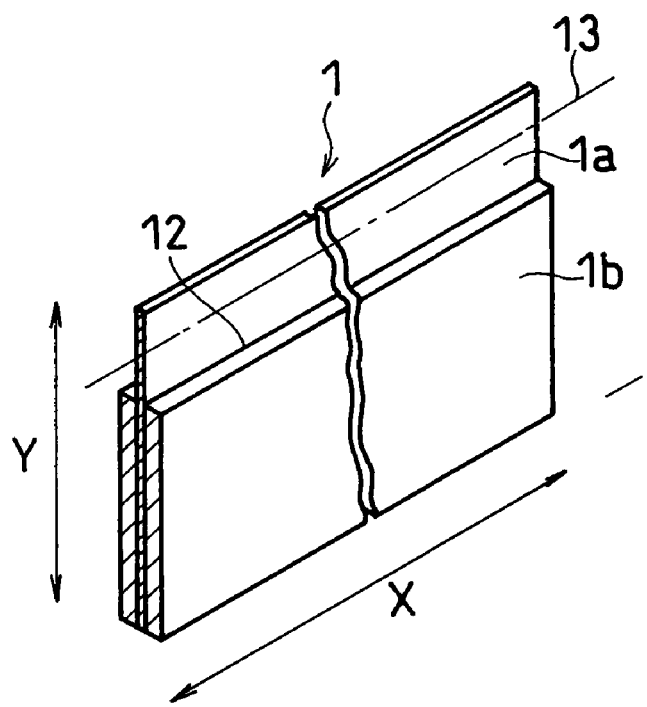
FIG. 2 shows a diagram of manufacturing procedure of a positive electrode plate of embodiment 1 of the invention.
Figure 2B:
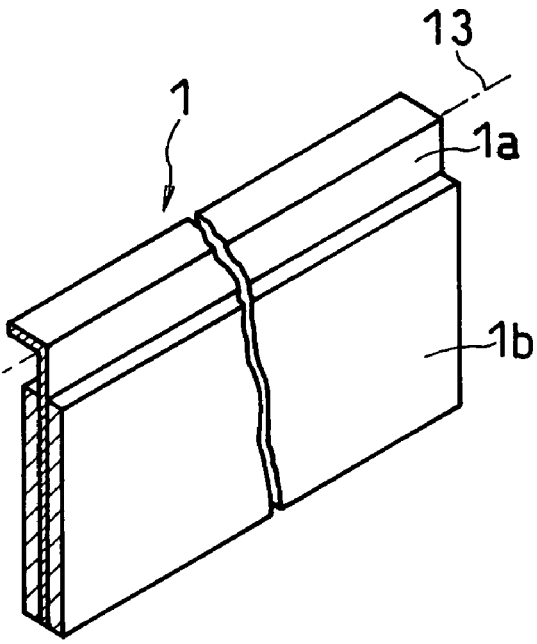
Figure 2C:
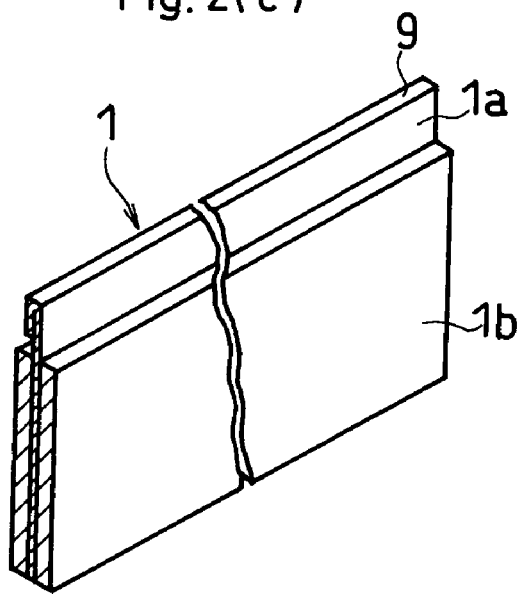
Figure 2D:
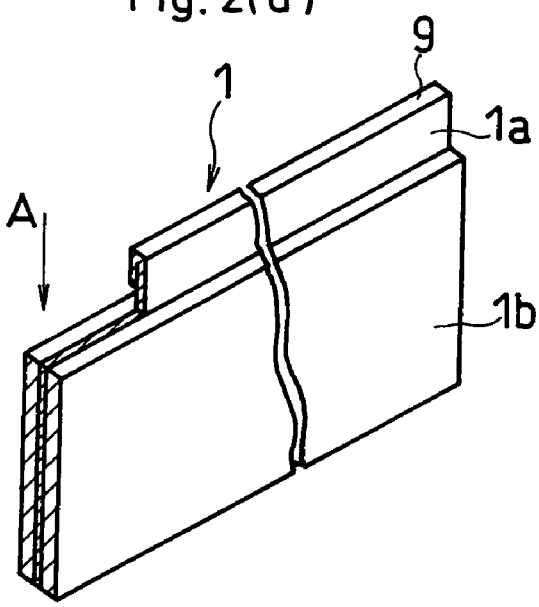

Then the exposed portion of the collector having a predetermined width protruding from boundary 12 is flexed along a straight line 13 parallel to the boundary, as shown in FIG. 2(b), and then is folded once to form positive collecting section 9, as shown in FIG. 2(c).

In addition, FIG. 2 shows the structure that the protruding end section of collector 1a of positive electrode is folded once, but it can be folded several times so long as the respective adjacent collecting sections 9 would not contact with each other when being revolved. This is also true in the following embodiments. Moreover, as shown in FIG. 2(d), collecting section 9 is not provided for the part of collecting section 9 positioned in the innermost periphery of set 4 of electrode plates in the revolving state. More specifically, this can be realized in the manner that, as shown in FIG. 2(a) ~FIG. 2(c), the part of positive collecting section 9 positioned in the innermost section is cut off after positive collecting section 9 is formed, alternatively, the part of collector la of positive electrode positioned in the innermost section is cut off in advance.

In the description, "innermost periphery" means the periphery of a circle positioned at the innermost portion of the winded set of electrode plates, and "collecting section" means a general term for first collecting section, second collecting section or both, or positive collecting section, negative collecting section or both, except a special designation.

Positive electrode plate 1 is formed to have the size of approximately 55 mm in width and 570 mm in length. Collector 1a of positive electrode plate 1 is folded once in above-mentioned method to form positive collecting section 9 of approximately 2.5 mm in width.

When cutting off the part of collecting section 9 which is in the innermost periphery of set 4 of electrode plates, the cutting process begins at the end edge of positive collecting section 9 which is positioned in the innermost periphery, continues along boundary 12 between the section which is coated with positive active-substance 1b and the positive collector 1a, and ends at the point approximately 100 mm away from the end edge, the section therebetween of positive collecting section 9 being cut off.

Stripe-shaped negative electrode plate 2 can be formed in the same manner as stripe-shaped positive electrode plate 1.

Negative electrode plate 2 is formed to have the size of approximately 61 mm in width and 600 mm in length. Collector 2a of negative electrode plate 2 is folded once in the method shown in FIG. 2(c) to form negative collecting section 15 of approximately 2.5 mm in width.

The process of cutting off the part of negative collecting section 15 which is positioned in the innermost periphery of set 4 of electrode plates is the same as positive electrode plate 1.

For the Lithium ion secondary battery formed from the electrode plates of the embodiment, because the collecting section is formed by folding once on the end section of the collector, the collecting section will not be damaged and will not be bent to such an extent that the separator would be punched through even though the collecting plate is pressed when being welded, so that the inner short-circuit can be reduced. Moreover, because the collecting section is not flexed greatly, the connection between the collecting sections and the collecting plates are reliable and stable.

Moreover, because the collecting section is not provided for the innermost periphery of the set of electrode plates with small radius of curvature when it is revolved into a roll, the resistance on the initial revolved section is small when revolving is started, so that this section can be revolved into a roll around a revolving core rod quickly, thereby the inner short-circuit due to the sharp crimping formed in the collecting section can be prevented.

Embodiment 2

Figure 3:
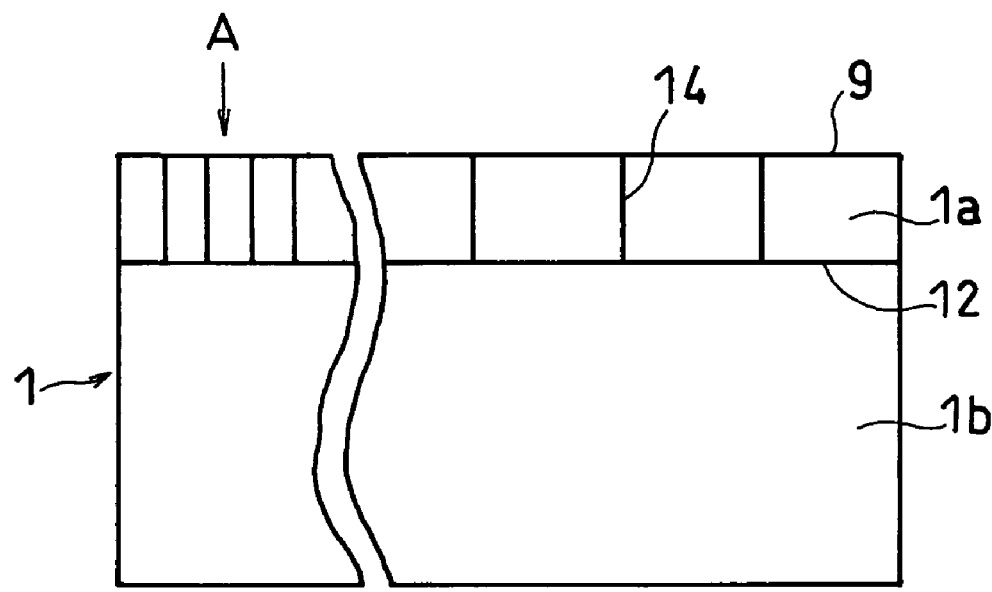
FIG. 3 shows an elevation view of a positive electrode plate of embodiment 2 of the invention, in which a plurality of splits in the direction from an end edge of a collecting section to a shorter side of the electrode plate are formed in the positive electrode plate.

FIG. 3 shows an elevation view of positive electrode plate 1 of embodiment 2.

In this embodiment, a plurality of splits 14 from an end edge of positive collecting section 9 towards a direction parallel to a shorter side (wideness) of stripe-shaped positive electrode plate 1 are formed on positive collecting section 9 of positive electrode plate 1, and disposed in the manner that a periphery portion of a circle on inner periphery of the revolved set of electrode plates comprises at least 4 splits and the spaces of splits 14 positioned in the inner periphery of winded set 4 of electrode plates are smaller than those of splits 14 positioned elsewhere. The inner periphery comprises the innermost periphery and the periphery of some circles abutting on the innermost periphery on which the sharp crimping may be caused. More specifically, the positive collecting section 9 is cut with a cutter from the end edge of positive collecting section 9 towards a direction parallel to a shorter side of stripe-shaped positive electrode plate 1, that is, to boundary 12 between the section which is coated with positive active-substance 1b and positive collector 1a. The spaces of splits 14 are approximately 5 mm in positive collecting section 9 which is positioned in the inner periphery of set 4 of electrode plates, 15 mm in positive collecting section 9 which is positioned in other periphery of set 4 of electrode plates.

Moreover, stripe-shaped negative electrode plate 2 can be formed in the same manner as stripe-shaped positive electrode plate 1.

For the Lithium ion secondary battery constituted of the electrode plates of the embodiment, because the collecting section is formed by folding once on the end section of the collector, the collecting section will not be damaged and not be bent to such an extent that the separator would be punched through even though the collecting plate is pressed when being welded, so that the probability of an inner short-circuit can be reduced. Moreover, because the collecting section is not flexed greatly, the connection between the collecting section and the collecting plates is reliable and stable.

Moreover, in the inner periphery of the set of electrode plates where the spaces of the splits in the collecting section are smaller than those in other section, the resistance on the initial revolved section is small when revolving is started, so that this section can be revolved into a roll around a revolving core rod easily, thereby the inner short-circuit due to the sharp crimping (namely, a sharp angle portion) formed in the collecting section can be prevented.

Embodiment 3

Figure 4:
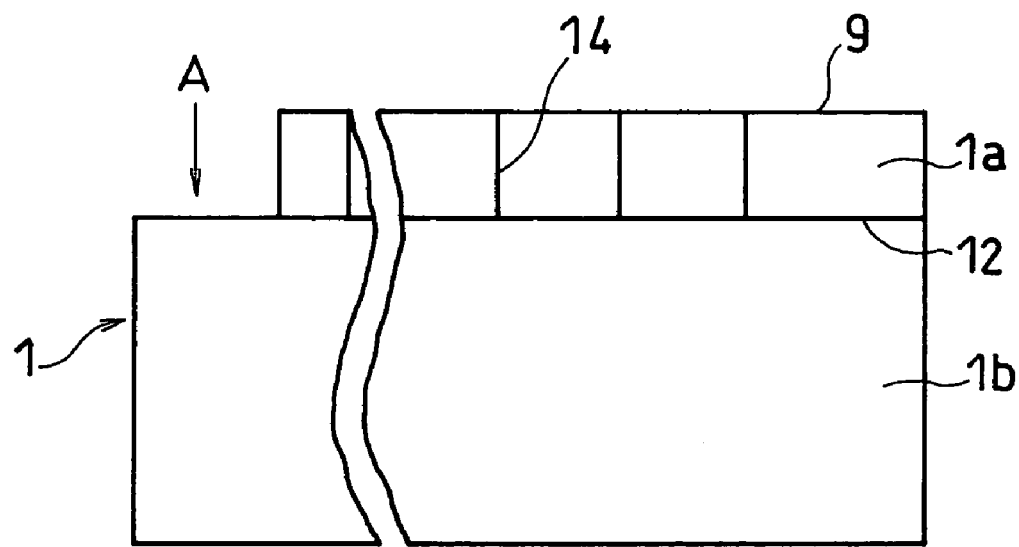
FIG. 4 shows an elevation view of a positive electrode plate of embodiment 3 of the invention, in which the positive collecting section is not provided in the section of the positive electrode plate positioned in the innermost periphery of the set of electrode plates, and a plurality of splits in the direction from an end edge of the collecting section to a shorter side of the electrode plate are formed in the positive electrode plate.

FIG. 4 shows an elevation view of positive electrode plate 1 of embodiment 3.

In this embodiment, collecting section 9 is not provided for the part of collecting section 9 which is positioned in the innermost periphery of set 4 of electrode plates in revolving state. More specifically, this can be realized in the manner that the part of positive collecting section 9 which is positioned in the innermost periphery is cut off after positive collecting section 9 is formed, alternatively, the part of positive collector 1a which is positioned in the innermost periphery is cut off in advance. And a plurality of splits 14 in the direction from the end edge of positive collecting section 9 to the shorter side of stripe-shaped positive electrode plate 1 are formed.

Moreover, stripe-shaped negative electrode plate 2 can be formed in the same manner.

For the Lithium ion secondary battery formed from the electrode plates of the embodiment, because the collecting section is formed by folding once on the end section of the collector, the collecting section will not be damaged and not be bent to such an extent that the separator would be punched through even though the collecting plate is pressed when being welded, so that the inner short-circuit can be reduced. Moreover, because the collecting section is not flexed greatly, the connection between the collecting section and the collecting plates can be reliable and stable.

Moreover, because the collecting section is not provided for the innermost periphery of the set of electrode plates with small radius of curvature when it is revolved into a roll, and a plurality of splits are provided in the collecting section, the resistance on the initial revolved section is small when revolving is started, so that this section can be revolved into a roll around the revolving core rod quickly, thereby the effect of preventing the inner short-circuit due to the sharp crimping formed in the collecting section can be improved.

Embodiment 4

Figure 5:
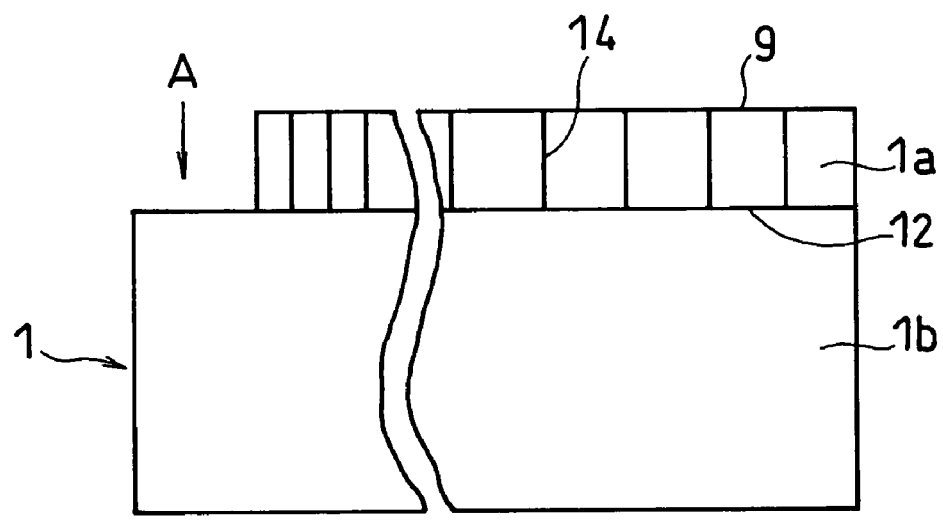
FIG. 5 shows an elevation view of a positive electrode plate of embodiment 4 of the invention, in which the positive electrode plate is formed, so that a space between two splits abutting each other positioned in the inner periphery of the set of electrode plates is smaller than that positioned elsewhere.

FIG. 5 shows an elevation view of positive electrode plate 1 of embodiment 4.

In this embodiment, the spaces of splits 14 positioned in the inner periphery of set 4 of electrode plates are smaller than those of splits 14 positioned elsewhere. Meanwhile, collecting section 9 is not provided for the part of collecting section 9 which is positioned in the innermost periphery of set 4 of electrode plates in revolving state. More specifically, this can be realized in the manner that the part of positive collecting section 9 which is positioned in the innermost periphery is cut off after positive collecting section 9 is formed, alternatively, the part of collector 1a of positive electrode which is positioned in the innermost periphery is cut off in advance.

Moreover, stripe-shaped negative electrode plate 2 can be formed in the same manner.

For the Lithium ion secondary battery constituted of the electrode plates of the embodiment, because the collecting section is not provided for the innermost periphery of the set of electrode plates with the smallest radius of curvature when it is revolved into a roll, and in the inner periphery of the set of electrode plates where the spaces of the splits provided in the collecting section in the revolving state are smaller than those in other section, resistance on the initial revolved section is decreased to a minimum when revolving is started, so that this section can be revolved into a roll easily, thereby the inner short-circuit due to the sharp crimping formed in the collecting section can be prevented.

Embodiment 5

Figure 6:
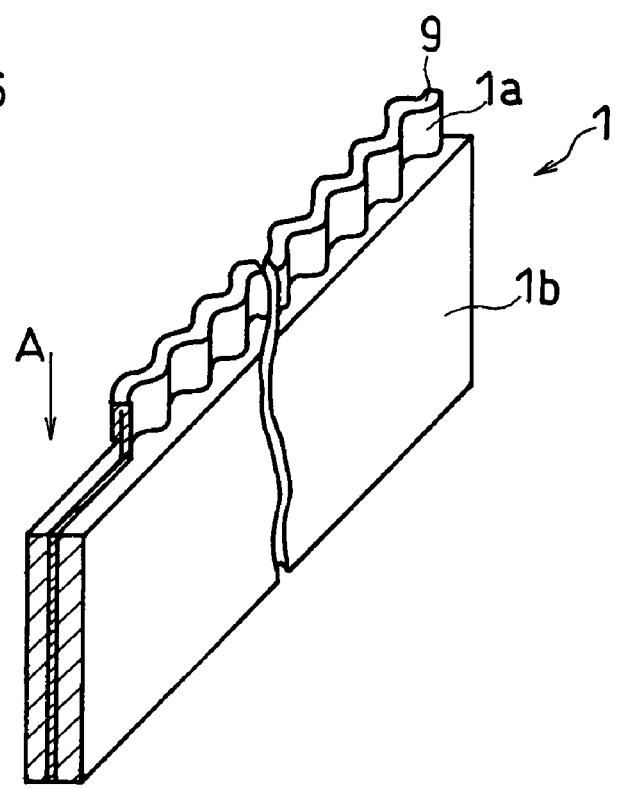
FIG. 6 shows a perspective view of a positive electrode plate of embodiment 5 of the invention, in which the positive collecting section is formed into a corrugation perpendicular to the direction of its length.
Figure 7A:
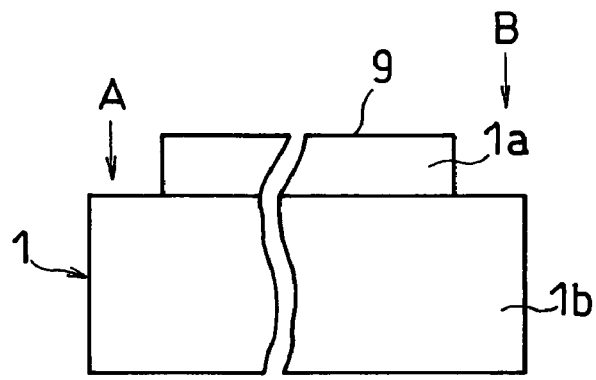
FIG. 7 shows an elevation view of a positive electrode plate of embodiment 6, in which the collecting section is not provided in the outmost periphery of the set of electrode plates.
Figure 7B:
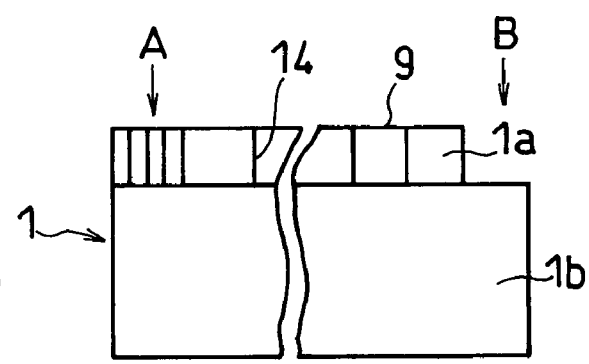
Figure 7C:
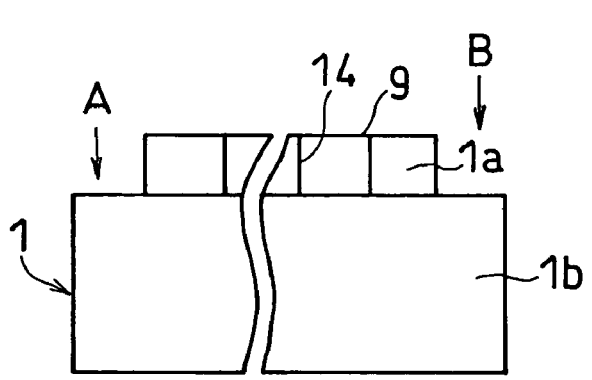
Figure 7D:
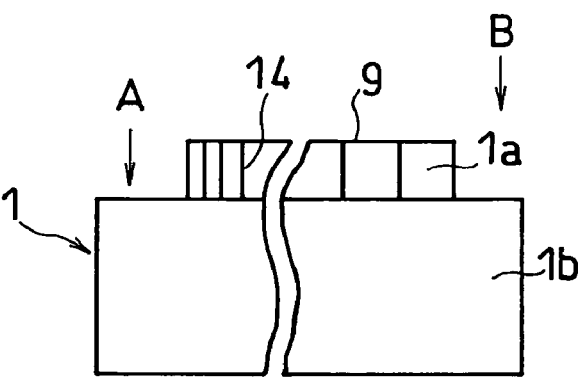

FIG. 6 shows an elevation view of positive electrode plate 1 of embodiment 5.

In this embodiment, a corrugation perpendicular to the direction of its length is formed on positive collecting section 9 plate 1. More specifically, the corrugation can be formed by clamping and pressing positive collecting section 9 using corrugation-shaped mould.

Moreover, stripe-shaped negative electrode plate 2 can be formed in the same manner.

For the Lithium ion secondary battery constituted of the electrode plates of the embodiment, the mechanical strength of the collecting section can be further increased with the aid of the corrugation, and the effect of preventing the inner short-circuit due to the flex of the collecting section is improved.

Embodiment 6

FIG. 7 shows a perspective view of positive electrode plate 1 of embodiment 6.

In this embodiment, positive collecting section 9 is not provided for the part of positive collecting section 9 which is positioned in the outermost periphery of set 4 of electrode plates in revolving state as shown in FIG. 2(d), FIG. 3, FIG. 4 and FIG. 5. More specifically, this can be realized in the manner that the part of positive collecting section 9 which is positioned in the innermost periphery is cut off after positive collecting section 9 is formed as shown in FIG. 2(a)~(c), alternatively, the part of collector 1a of positive electrode which is positioned in the innermost periphery is cut off in advance, as shown in FIG. 7(a) to FIG. 7(d) respectively.

When cutting off the part of collecting section 9 which is in the outermost periphery of set 4 of electrode plates, the cutting process begins at the end edge of positive collecting section 9 which is positioned in the outermost periphery, continues along boundary 12 between the section which is coated with positive active-substance 1b and positive collector 1a, and ends at the point 70 mm away from the end edge, the section therebetween of positive collecting section 9 being cut off.

Moreover, stripe-shaped negative electrode plate 2 can be formed in the same manner.

For the Lithium ion secondary battery constituted of the electrode plates of the embodiment, when a set of electrode plates revolved into a roll being inserted in a casing, the collecting section in the outmost periphery of the set of electrode plates will be not hanged on the opening of the casing, so that the set of electrode plates can be inserted in the casing easily because the collecting section is not provided for the outmost periphery of the set of electrode plates, the efficiency of production and the quality being able to be increased.

Embodiment 7

Figure 8:
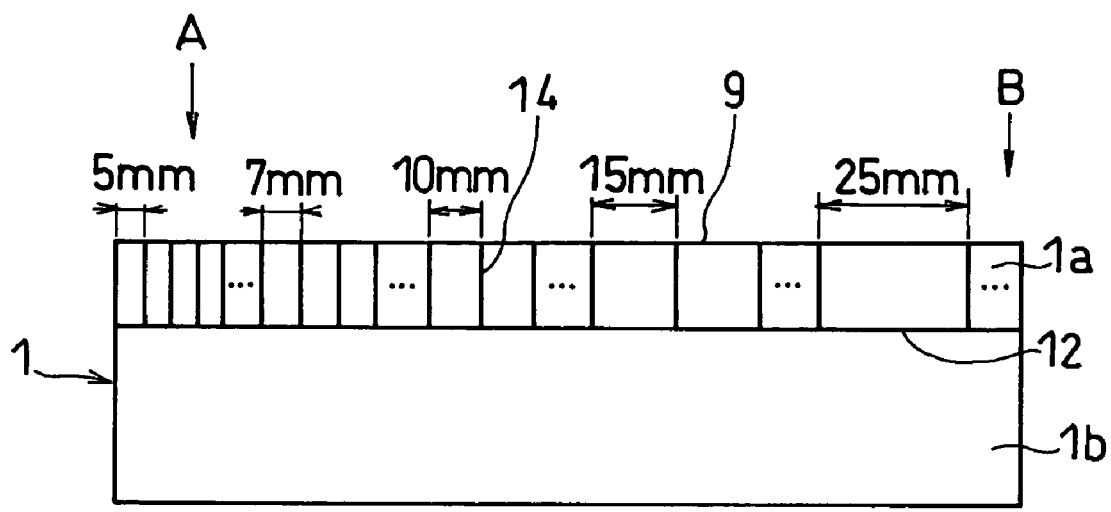
FIG. 8 shows an elevation view of a positive electrode plate of embodiment 7, in which the splits are formed as the spaces of the splits being increased logarithmically from the inner periphery to outer periphery of the set of electrode plates.

FIG. 8 is an elevation view showing positive electrode plate 1 in embodiment 7.

In this embodiment, a plurality of splits 14 from an end edge of positive collecting section 9 towards a direction parallel to a shorter side (wideness) of stripe-shaped positive electrode plate 1 are formed on positive collecting section 9 of positive electrode plate 1, and disposed in the manner that a space of two splits 14 abutting each other on positive collecting section 9 is logarithmically increased from inner periphery to outer periphery of winded set 4 of electrode plates.

More specifically, positive collecting section 9 is cut with a cutter from the end edge of positive collecting section 9 towards a direction parallel to a shorter side of stripe-shaped positive electrode plate 1, that is, towards boundary 12 between the section which is coated with positive active-substance 1b and positive collector 1a, to form a plurality of splits 14. The positive collecting section 9 is cut in the inner periphery of set 4 of electrode plates, in which the portions of spaces being respectively 5 mm, 7 mm and 10 mm between two splits 14 abutting each other are cut respectively 10 times, and last, the positive collecting section 9 is cut 8 times in the outer periphery of set 4 of electrode plates, in which a space between two splits abutting each other is 25 mm.

Moreover, stripe-shaped negative electrode plate 2 can be formed in the same manner as stripe-shaped positive electrode plate 1.

Since in forming of splits 14, a space of two splits 14 abutting each other on positive collecting section 9 is logarithmically increased from inner periphery to outer periphery of winded set 4 of electrode plates, the resistance on the initial revolved section is small when revolving is started, so that this section can be revolved into a roll around a revolving core rod quickly, thereby the effect of preventing the inner short-circuit resulting from the sharp crimping formed in the collecting section can be further enhanced.

Embodiment 8

Figure 9:
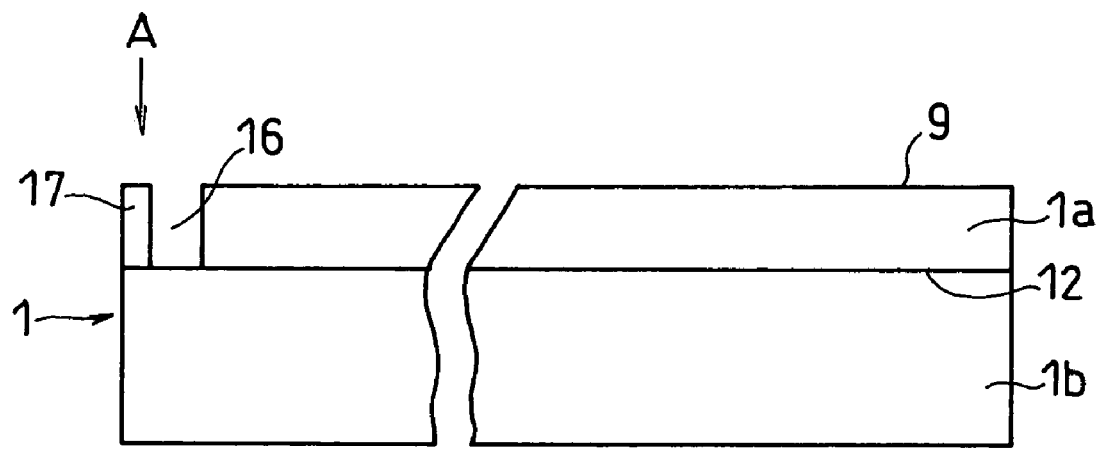
FIG. 9 shows an elevation view of a positive electrode plate of embodiment 8, in which one or more notches are formed on the innermost periphery of the set of electrode plates.

FIG. 9 is an elevation view showing positive electrode plate 1 in embodiment 8.

In this embodiment, a notch 16 from an end edge of positive collecting section 9 towards a direction parallel to a shorter side (wideness) of stripe-shaped positive electrode plate 1 is formed from a location of approximately 5 mm apart from the inner side at the wideness direction of positive collecting section 9 at the innermost periphery, having a space of 15 mm. The inner periphery of approximately 5 mm forms a strip-shaped collecting section 17.

Specifically, positive collecting section 9 is cut and cut off a part with a cutter from the end edge at the length direction of positive collecting section 9 towards a direction parallel to a shorter side of stripe-shaped positive electrode plate 1, that is, towards boundary 12 between the section which is coated with positive active-substance 1b and positive collector 1a, to form notch 16.

In embodiment 8, one notch 16 is provided on the innermost periphery, however a plurality of notches 16 may be provided on the innermost periphery. The notches provided on the other periphery except the innermost periphery may be splits, or splits and notches.

Moreover, stripe-shaped negative electrode plate 2 can be formed in the same manner as stripe-shaped positive electrode plate 1.

In the cells constituted as the above description, 100 cells were prepared for each of the above embodiments.

Comparing Example 1

In the Lithium ion secondary battery used in comparing example 1, thin metal plates are welded on the ends of the collectors in the whole set of electrode plates from its innermost periphery to its outermost periphery to form positive collecting section 9 and negative collecting section 15 which have the increased thickness, and splits 14 with same spaces are formed on both collecting sections. With such a positive electrode plate 1 and a negative electrode plate 2, the collecting section 9 and negative collecting section 15 are welded onto positive collecting plate 10 and negative collecting plate 11 respectively. The subsequent manufacturing procedures are the same as that of the embodiments. 100 cells like this are prepared.

Comparing Example 2

In the Lithium ion secondary battery used in the comparing example 2, positive collecting section 9 and negative collecting section 15 are formed in the whole set of electrode plates from its innermost periphery to its outermost periphery without splits 14 formed in positive electrode plate 1 and negative electrode plate 2. Positive collecting section 9 and negative collecting section 15 are welded onto positive collecting plate 10 and negative collecting plate 11 respectively. The subsequent manufacturing procedures are the same as that of the embodiments. 100 cells like this are prepared.

Evaluation of the Cells

Fall-impact tests were performed for each 100 cells of the embodiment and comparing examples 1, 2 respectively. The falling height is 75 cm, and falling down of a cell thrice each for a state of the cell that is in an upright, an upside down and a horizontal direction respectively is one cycle.

For each cycle, the open-circuit voltages of a cell are measured to judge whether the inner short-circuit between the opposite electrode plates occurs, which results from pricking the seperator through due to the sharp crimping formed in the positive collecting section 9 or the collecting section of negative electrode. The inner short-circuit occurs when the open-circuit voltage of a cell drops, and the number of the cycles in which the open-circuit voltage of a cell drops can be compared and evaluated. Moreover, for a cell having open-circuit voltage dropped, the position where the inner short-circuit occurs can be confirmed by disassembling and analyzing the cell, and only the cells in which the inner short-circuits between the opposite electrode plates occur, which result from pricking the separators through due to the sharp crimping formed in the collecting sections of positive electrodes or the collecting sections of negative electrodes, can be counted.

Result is Shown in Table 1 in the innermost periphery of the set of electrode plates occurs, while the positions where the inner short-circuits occur in the comparing examples are all in the collecting sections positioned in the innermost peripheries of the sets of electrode plates.

Therefore, it can be considered that for the cells of the comparing examples, the collecting sections positioned in the innermost peripheries with the smallest radii of curvature of the sets of electrode plates which are revolved into rolls have sharp crimping, so that the separators may be punched through by the crimping, thereby the inner short-circuits may occur. On the other hand, for the cells of the embodiment, the collecting sections are not provided for the innermost peripheries of the sets of electrode plates with the smallest radii of curvature when they are revolved into rolls, so that the inner short-circuits can be suppressed.

While what described above is the collecting section which is formed by folding once an end section of a collector, the times of folding the end section of the collector can be more than one so long as the final thickness of the collecting section is smaller than that of the electrode plates. Although said folding times can be determined according to the thickness of the collector itself, it is preferred that the folding times are 1~5. Hence, the same effect can be obtained using the collecting section formed by folding the end section of the collector several times. For the case of the embodiments, it is preferred that the positive collector made of aluminum foil is folded 3 times, and the negative collector made of copper foil is folded 2 times.

Moreover, in some electrochemical components, if a collector is made by a material having a higher mechanical strength, a collecting section may be formed directly by the collector not being folded.

The way of "split", "notch" or "cutoff" is executed on all the layers constituting the collecting section in each of the above embodiments. However, if the way is executed on at least one layer therein, the effect of preventing the sharp crimping from being formed on the collecting section when being revolved may be also obtained, thereby the inner short-circuit being restrained.

Moreover, while what described above is the case that both the positive collecting plate and the negative collecting plate

TABLE 1

|  | 10 | 20 | 30 | 40 | 50 | 60 | 70 | 80 | 90 | 100 |
|---|---|---|---|---|---|---|---|---|---|---|
| embodiment | 0/100 | 0/100 | 0/100 | 0/100 | 0/100 | 0/100 | 3/100 | 5/100 | 9/100 | 15/100 |
| comparing example 1 | 0/100 | 0/100 | 0/100 | 4/100 | 7/100 | 12/100 | 15/100 | 20/100 | 22/100 | 25/100 |
| comparing example 2 | 0/100 | 0/100 | 3/100 | 5/100 | 10/100 | 13/100 | 17/100 | 20/100 | 24/100 | 30/100 |

As shown in the table, the open-circuit voltages of the cells of embodiments 1-8 which obtain the same results begin to drop after 70 cycles. As a contrast, the open-circuit voltages of the cells of comparing examples 1 begin to drop after 40 cycles, and the open-circuit voltages of the cells of comparing examples 2 begin to drop after 30 cycles. It can be considered that the cells of the embodiment have better structure than that of the comparing ones, so that the inner short-circuits between the positive collecting section 9 and the collecting section of negative electrode are suppressed.

Moreover, comparing the result of disassembling and analyzing the cells having open-circuit voltages dropped, it is found that there is no cell of embodiments 1-8 in which the inner short-circuit between the collecting sections positioned as described above are used in the collecting sections, the same effect can be obtained by using either one of two.

Moreover, while what described above is the case that the liquid electrolyte is used, the same effect can be obtained by using polymer electrolyte as the electrolyte other than liquid.

Moreover, while what described above is a cylinder-shaped Lithium ion secondary battery having the cylindrical size 18650 (18 in diameter and 650 in height), the same effect can be obtained when the shape and the size of cell are not limited.

Moreover, while what described above is a Lithium ion cell, the same effect can be obtained for the electrical components such as cells other than Lithium ion cells, double-layered capacitors and like.

As described above, they can be used to the rolled electrochemical components such as cells, double-charge-layered capacitors and like in which the positive electrode plate and the negative electrode plate are revolved into a roll with a separator being sandwiched therebetween, and the collectors are incorporated with the collecting plates. Furthermore the end sections of the collectors connected with the collecting plates are improved, so that the rolled electrochemical components with high quality can be provided.

We claim:

1. A set of electrode plates for a rolled electrochemical component, comprising:
    a first electrode plate,
    a second electrode plate and
    a separator, said separator being positioned between the first electrode plate and the second electrode plate, and said first electrode plate, said second electrode plate and said separator being revolved into a roll in the length direction,
    wherein said first electrode plate comprises a first collector and active material coated on the surface of said first collector and said second electrode plate comprises a second collector and active material coated on the surface of said second collector,
    a first exposed portion with a predetermined width on which the active material is not coated being formed on at least one of two terminals in a width direction of the first electrode plate to form a first collecting section,
    a second exposed portion with a predetermined width on which the active material is not coated being formed on at least one of two terminals in a width direction of the second electrode plate to form a second collecting section, and
    at least a portion of one of said first collecting section and said second collecting section in at least an innermost periphery or directly adjacent to the innermost periphery of the one of said first collecting section and second collecting section comprises a cut-off portion having a predetermined width,
    wherein at least four splits starting from a side edge of the collecting section in its width direction are formed on the collecting section which is positioned at least in the inner periphery,
    wherein the inner periphery is positioned between the innermost periphery and an outer periphery, and the outer periphery is positioned between the inner periphery and the outermost periphery, and
    wherein a plurality of splits starting from a side edge of the collecting section in its width direction are formed on the collecting section which is positioned in the remaining periphery of said set of electrode plates, and a space between two splits abutting each other on the collecting section is continuously increased from the inner periphery to the outer periphery of said set of electrode plates.

2. The set of electrode plates according to claim 1, wherein said first collecting section and said second collecting section are formed in a manner that the first exposed portion and the second exposed portion are folded down along the width direction.

3. The set of electrode plates according to claim 1, wherein a structure for preventing crimping is formed by cutting off the collecting sections which are positioned in the inner periphery.

4. The set of electrode plates according to claim 3, wherein the collecting sections which are positioned in the outermost periphery of said set of electrode plates are removed.

5. The set of electrode plates according to claim 3, wherein corrugation is formed on the collecting section positioned in the remaining periphery of said set of electrode plates.

6. The set of electrode plates according to claim 3, wherein a plurality of splits starting from a side edge of the collecting section in its width direction are formed on the collecting section which is positioned in the remaining periphery of said set of electrode plates.

7. The set of electrode plates according to claim 6, wherein the collecting section which is positioned in the outermost periphery of said set of electrode plates is cut off.

8. The set of electrode plates according to claim 3, wherein a plurality of splits starting from a side edge of collecting section in its width direction are formed on the collecting section which is positioned in the remaining periphery of said set of electrode plates, and in the collecting section which is positioned in the remaining periphery of the set of electrode plates a space between two splits abutting each other on the collecting section which is positioned in at least the inner periphery is smaller than a space between two splits positioned in the remaining periphery.

9. The set of electrode plates according to claim 8, wherein the collecting section which is positioned in the outermost periphery of said set of electrode plates is removed.

10. The set of electrode plates according to claim 1, wherein the collecting section which is positioned in the outermost periphery of said set of electrode plates is removed.

11. The set of electrode plates according to claim 1, wherein at least one notch and at least one strip-shaped collecting section are formed in the inner periphery.

12. The set of electrode plates according to claim 2, wherein at least one notch or at least four splits are formed in at least one of the layers forming the collecting section in the inner periphery.

13. A cell comprising:
    a set of electrode plates, said set of electrode plates comprising a positive electrode plate, a negative electrode plate and a separator, said separator being positioned between the positive electrode plate and the negative electrode plate, and said positive electrode, said negative electrode, and said separator being revolved into a roll in the length direction,
    wherein said positive electrode plate comprises a positive collector and active material coated on a surface of said positive collector and said negative electrode plate comprises a negative collector and active material coated on a surface of said negative collector, two exposed portions with a predetermined width on which the active material is not coated being formed on at least one of two terminals in a width direction respectively of the positive and negative electrode plates to respectively constitute a positive collecting section and a negative collecting section;
    a negative collecting plate connected electrically to said negative collecting section; and
    a positive collecting plate connected electrically to said positive collecting section; at least a portion of at least one of the positive collecting section and the negative collecting section at least in an inner periphery of the set of electrode plates being removed, wherein the inner periphery is positioned between the innermost periphery and an outer periphery, and the outer periphery is positioned between the inner periphery and the outermost periphery,
    and
    wherein, the at least a portion of one of said first collecting section and said second collecting section comprises a plurality of splits such that the spaces between the splits are continuously increased from an inner periphery to an outer periphery of the electrode plate.

14. The cell according to claim 13, wherein a structure for preventing crimping is formed in a manner that the exposed portions are respectively folded down along the width direction.

15. The cell according to claim 14, wherein said structure for preventing crimping is formed by cutting off the collecting sections which are positioned at least in the inner periphery.

16. The cell according to claim 15, wherein the collecting sections which are positioned in the outermost periphery of said set of electrode plates are cut off.

17. The cell according to claim 15, wherein corrugation is formed on the collecting section positioned in the remaining periphery of said set of electrode plates.

18. The cell according to claim 15, wherein a plurality of splits starting from a side edge of the collecting section in its width direction are formed on the collecting section which is positioned in the remaining periphery of said set of electrode plates.

19. The cell according to claim 18, wherein the collecting section which is positioned in the outermost periphery of said set of electrode plates is removed.

20. The cell according to claim 15, wherein a plurality of splits starting from a side edge of the collecting section in its width direction are formed on the collecting section which is positioned in the remaining periphery of said set of electrode plates, and in the collecting section which is positioned in the remaining periphery of the set of electrode plates a space between two splits abutting each other on the collecting section which is positioned in at least the inner periphery is smaller than a space between two splits positioned in other periphery.

21. The cell according to claim 20, wherein the collecting section which is positioned in the outermost periphery of said set of electrode plates is removed.

22. The cell according to claim 14, wherein said structure for preventing crimping is formed in the manner that at least four splits starting from a side edge of the collecting section in its width direction are formed on the collecting section which is positioned at least in the inner periphery.

23. The cell according to claim 22, wherein the collecting section which is positioned in the outermost periphery of said set of electrode plates is cut off.

24. The cell according to claim 21, wherein a plurality of splits starting from a side edge of the collecting section in its width direction are formed on the collecting section which is positioned in the remaining periphery of said set of electrode plates, and a space of two splits abutting each other on the collecting section is increased from the inner periphery to the outer periphery of said set of electrode plates.

25. The cell according to claim 14, wherein said structure for preventing crimping is formed by forming at least one notch and at least one strip-shaped collecting section at least in the inner periphery.

26. The cell according to claim 14, wherein said structure for preventing crimping is formed by forming at least one notch or at least four splits in at least one of layers constituting the collecting section at least in the inner periphery.

27. A set of electrode plates for a rolled electrochemical component, comprising:

a first electrode plate, a second electrode plate and a separator, said separator being positioned between the first electrode plate and the second electrode plate, and said first electrode plate, said second electrode plate and said separator being revolved into a roll in the length direction, wherein said first electrode plate comprises a first collector and active material coated on the surface of said first collector and said second electrode plate comprises a second collector and active material coated on the surface of said second collector, a first exposed portion with a predetermined width on which the active material is not coated being formed on at least one of two terminals in a width direction of the first electrode plate to form a first collecting section, a second exposed portion with a predetermined width on which the active material is not coated being formed on at least one of two terminals in a width direction of the second electrode plate to form a second collecting section, at least a portion of one of said first collecting section and said second collecting section in at least an innermost periphery or directly adjacent to the innermost periphery of the one of said first collecting section and second collecting section comprises a cut-off portion having a predetermined width, wherein, the at least a portion of one of said first collecting section and said second collecting section comprises a plurality of splits such that the spaces between the splits are continuously increased from an inner periphery to an outer periphery of the electrode plate.

28. The set of electrode plates according to claim 27, wherein the plurality of splits starting from a side edge of the collecting section in its width direction are formed on the collecting section which is positioned in the remaining periphery of said set of electrode plates, and in the collecting section which is positioned in the remaining periphery of the set of electrode plates a space between two splits abutting each other on the collecting section which is positioned in at least the innermost periphery is smaller than a space between two splits positioned in the remaining periphery.

29. The set of electrode plates according to claim 27, wherein at least four splits starting from a side edge of the collecting section in its width direction are formed on the collecting section which is positioned at least in the innermost periphery.

\* \* \* \* \*